US009650692B2

(12) United States Patent
Szesni et al.

(10) Patent No.: US 9,650,692 B2
(45) Date of Patent: May 16, 2017

(54) METHOD FOR PRODUCING PACKAGING STEEL

(71) Applicant: ThyssenKrupp Rasselstein GmbH, Andernach (DE)

(72) Inventors: Anika Szesni, Kettig (DE); Helmut Oberhoffer, St. Johann (DE); Martin Schlupp, Rheinbrohl (DE); Dirk Matusch, Neuwied (DE); Reiner Sauer, Neuwied (DE)

(73) Assignee: ThyssenKrupp Rasselstein GmbH, Andernach (DE)

( * ) Notice: Subject to any disclaimer, the term of this patent is extended or adjusted under 35 U.S.C. 154(b) by 324 days.

(21) Appl. No.: 14/365,654

(22) PCT Filed: Nov. 30, 2012

(86) PCT No.: PCT/EP2012/074115
§ 371 (c)(1),
(2) Date: Jun. 16, 2014

(87) PCT Pub. No.: WO2013/092170
PCT Pub. Date: Jun. 27, 2013

(65) Prior Publication Data
US 2015/0010779 A1    Jan. 8, 2015

(30) Foreign Application Priority Data

Dec. 22, 2011 (DE) .................. 10 2011 056 847

(51) Int. Cl.
*C21D 9/46* (2006.01)
*C23F 17/00* (2006.01)
(Continued)

(52) U.S. Cl.
CPC ............. *C21D 9/46* (2013.01); *B32B 15/01* (2013.01); *B32B 15/012* (2013.01);
(Continued)

(58) Field of Classification Search
None
See application file for complete search history.

(56) References Cited

U.S. PATENT DOCUMENTS 3,174,917 A * 3/1965 Lesney ................. C23C 10/28
205/170
3,378,360 A * 4/1968 McFarland ............ C21D 1/185
148/320

(Continued)

FOREIGN PATENT DOCUMENTS

CH         469810       3/1969
DE      19640398626     9/1964
(Continued)

OTHER PUBLICATIONS

R.R. Mohanty, O.A. Girina, and N.M. Fonstein Effect of Heating Rate on the Austenite Formation in Low-Carbon High-Strength Steels Annealed in the Intercritical Region Journal of Metallurgical and material transation vol. 42A , p. 3680-3690, Published on Jun. 9, 2011.*

(Continued)

*Primary Examiner* — Jessee Roe
*Assistant Examiner* — Jenny Wu
(74) *Attorney, Agent, or Firm* — Paul D. Bianco; Gary S. Winer; Fleit Gibbons Gutman Bongini & Bianco PL

(57) ABSTRACT

The invention relates to a method for producing packaging steel consisting of a cold-rolled steel sheet made of unalloyed or low-alloy steel having a carbon content of less than 0.1%. In order to provide high-strength packaging steel that has good formability and high corrosion resistance and can be produced in as energy-saving a manner as possible, the steel sheet according to the invention is first coated with a metallic coating and then annealed in a recrystallizing manner at a heating rate of more than 75 K/s and preferably more than 100 K/s to temperatures of more than 700° C., (Continued)

such that the metallic coating melts. The coated and annealed steel sheet is then quenched to normal temperature at a cooling rate of at least 100 K/s.

15 Claims, 1 Drawing Sheet

(51) Int. Cl.
| | |
|---|---|
| C21D 1/18 | (2006.01) |
| C22C 38/00 | (2006.01) |
| C22C 38/04 | (2006.01) |
| C22C 38/02 | (2006.01) |
| C22C 38/06 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C21D 8/02 | (2006.01) |
| C23C 2/06 | (2006.01) |
| C23C 2/26 | (2006.01) |
| C23C 2/28 | (2006.01) |
| C21D 9/52 | (2006.01) |
| C21D 1/26 | (2006.01) |
| B32B 15/01 | (2006.01) |
| C22C 38/18 | (2006.01) |
| C21D 1/42 | (2006.01) |
| C22C 38/32 | (2006.01) |
| B65D 1/12 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |

(52) U.S. Cl.
CPC .......... *B32B 15/013* (2013.01); *B32B 15/015* (2013.01); *B65D 1/12* (2013.01); *C21D 1/18* (2013.01); *C21D 1/26* (2013.01); *C21D 1/42* (2013.01); *C21D 8/0273* (2013.01); *C21D 9/52* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C23C 2/06* (2013.01); *C23C 2/26* (2013.01); *C23C 2/28* (2013.01); *C23F 17/00* (2013.01); *C21D 8/0236* (2013.01); *C21D 2211/001* (2013.01); *C21D 2211/002* (2013.01); *C21D 2211/005* (2013.01); *C21D 2211/008* (2013.01); *Y10T 428/12* (2015.01); *Y10T 428/12722* (2015.01); *Y10T 428/12757* (2015.01); *Y10T 428/12799* (2015.01); *Y10T 428/12854* (2015.01); *Y10T 428/12972* (2015.01)

(56) References Cited

U.S. PATENT DOCUMENTS

| | | | | |
|---|---|---|---|---|
| 3,779,798 | A | * 12/1973 | Clinton | .................... C21D 9/52 148/530 |
| 5,074,924 | A | 12/1991 | Ushioda et al. | |
| 5,218,178 | A | * 6/1993 | Peysakhovich | ........ H05B 6/102 148/567 |
| 5,853,903 | A | * 12/1998 | Hosoya | ................... C22C 38/12 148/320 |
| 6,159,622 | A | 12/2000 | Hori et al. | |
| 2010/0000634 | A1 | 1/2010 | Spehr et al. | |
| 2010/0065169 | A1* | 3/2010 | Cockcroft | ............. C08F 220/56 148/713 |
| 2011/0220252 | A1 | 9/2011 | Hammer et al. | |

FOREIGN PATENT DOCUMENTS

| | | |
|---|---|---|
| DE | 19650453588 | 5/1965 |
| DE | 1483247 | 3/1969 |
| DE | 102006054300 | 5/2008 |
| EP | 0406619 | 1/1991 |
| EP | 0823490 | 2/1998 |
| JP | S6021368 | 2/1985 |
| JP | S6314818 | 1/1988 |
| JP | H0770724 | 3/1995 |
| JP | 3 162901 | 5/2001 |
| WO | 2009021898 | 2/2009 |

OTHER PUBLICATIONS

International Preliminary Report on Patentability (IPRP) published Jun. 22, 2014 for International Patent Application No. PCT/EP2012/074115 filed Apr. 18, 2013.
Spiekermann, Peter, Alloys—a special problem of patent law? (XP-002184689), pp. 1-20.
Third Party Observation for PCT/EP2012/74115 submitted May 2, 2014.
Spiekermann, Peter, Alloys—a special problem of patent law? (XP-002184689), pp. 1-20, 1995.
Furuno, et al, XP-002689556, Apr. 28, 1986, abstract only.
Constitution and Properties of Steel, vol. 7, 1992, selected pages.
Written Opinion for PCT/EP2012/074115, filed Nov. 30, 2012.
English translation of International Search Report dated Apr. 12, 2013 for PCT/EP2012/074115.
Furuno Y. et al, "Steel sheet for making easy-to-open can—is hot and cold worked then heat treated to obtain controlled amt. of martensite in structure", XP002689556, vol. 1987, No. 50, Nov. 9, 1987 WPI/THOMSON.

* cited by examiner

METHOD FOR PRODUCING PACKAGING STEEL

FIELD OF THE DISCLOSURE

The invention concerns a method for producing packaging steel from a cold-rolled steel sheet.

BACKGROUND OF THE DISCLOSURE

From CH 469 810, a thin-wall steel product in the form of a sheet or strip and a method for its production are known, which can be used for the production of tinplate with a higher strength. The steel product is produced from an unalloyed steel with a carbon content of 0.03-0.25 wt % and has a manganese content of 0.2-0.6 wt % and a silicon content of less than 0.011 wt %. The steel product is characterized by a fine structure, consisting, at least partially, of martensite and ferrite, and has tensile strengths of at least 6328 kg/cm$^2$ and an elongation at break of at least 1.5%. For the formation of these characteristics, the steel product is first heated in a furnace to a temperature above the $A_1$ point and subsequently quenched in a water bath.

Increasingly, higher demands are made on the characteristics of metallic materials for the production of packagings, in particular with regard to their formability and their strength and their corrosion resistance. It is true that so-called dual phase steels are known from the automobile industry, which have a multiphase structure, which essentially consists of martensite and ferrite or bainite, and which, on the one hand, have a high tensile strength and, on the other hand, a high elongation at break also. Such a dual phase steel with a yield strength of at least 580 MPa and an elongation at break $A_{80}$ of at least 10% is known, for example, from WO 2009/021898 A1. As a result of the combination of the material characteristics of such dual phase steels with a high strength and a good deformability, these dual phase steels are suitable, in particular, for the production of complex-shaped and highly stressable components, as are needed, for example, in the area of body construction for automobiles.

The alloy of the known dual phase steels is, as a rule, composed of a martensite fraction of 20% to 70% and any residual austenite fraction and ferrite and/or bainite. The good formability of dual phase steels is guaranteed by a relatively soft ferrite phase and the high strength is produced by the solid martensite and bainite phase, bound in a ferrite matrix. The desired characteristics with regard to formability and strength can be controlled in dual phase steels, within broad limits, by the alloy composition. Thus, for example, by the addition of silicon, the strength can be increased by the hardening of the ferrite or the bainite. By the addition of manganese, the martensite formation can be influenced positively and the formation of perlite can be prevented. Also, the addition of aluminum, titanium, and boron can increase the strength. The addition of aluminum is, moreover, utilized for the deoxidation and the binding of any nitrogen contained in the steel. For the formation of the multiphase alloy structure, dual phase steels are subjected to a recrystallizing (or austenitizing) heat treatment, in which the steel strip is heated to such temperatures, with subsequent cooling, that the desired multiphase alloy structure is established with an essentially ferritic-martensitic structure formation. Usually, cold-rolled steel strips are annealed in a recrystallizing manner in a throughput annealing process in an annealing furnace for economic reasons, wherein the parameters of the annealing furnace, such as through-flow speed, annealing temperature, and cooling rate, are established in accordance with the required structure and the desired material characteristics.

From DE 10 2006 054 300 A1, a higher-strength dual phase steel and a method for its production are known, wherein in the production method, a cold- or hot-rolled steel strip is subjected to a recrystallizing through-flow annealing in a through-flow annealing furnace, in a temperature range of 820° C. to 1000° C., and the annealed steel strip is subsequently cooled from this annealing temperature, at a cooling rate between 15 and 30° C. per second.

As a rule, the dual phase steels known from the automobile industry are not suitable for use as packaging steel, because especially due to the high fractions of alloy elements, such as manganese, silicon, chromium, and aluminum, they are very expensive and because some of the known alloy elements should not be employed for use as packaging steel in the food area, because a contamination of the food by diffusion of the alloy components into the contents must be ruled out. Furthermore, many of the known dual phase steels have such a high strength that they cannot be cold-rolled with the units usually used for the production of packaging steel.

Packaging steel must, moreover, have a high corrosion resistance and a good resistance to acids, since the contents of the packagings made of packaging steel, such as cans for beverages and food, frequently contain acid. Packaging steel, therefore, has a metallic coating as an anti-corrosion layer. The quality of this anti-corrosion layer depends, very substantially, on its adhesive capacity to the steel sheet surface. To improve the corrosion resistance of the coating and the adhesion of the anti-corrosion layer on the steel sheet surface, the tin coating placed galvanically on the steel sheet, for example, during the production of tinplate, is melted after the coating process. To this end, the coating deposited galvanically on the steel strip is heated to a temperature slightly above the melting point of the coating material (with a tin coating, for example, to 240° C.) and is subsequently quenched in a water bath. By the melting of the coating, the surface of the coating receives a shiny appearance and the porosity of the iron-tin alloy layer between the coating and the steel sheet is reduced, wherein its corrosion resistance is increased and its permeability for aggressive substances, for example, organic acids, is reduced.

SUMMARY OF THE DISCLOSURE

Proceeding from this, a goal of one embodiment of the invention is to prepare a higher-strength packaging steel with a good formability and high corrosion resistance and to indicate a method for its production that is as energy-efficient as possible.

The steel sheet in accordance with the invention for use as packaging steel is produced from a low-alloy and cold-rolled steel with a carbon content of less than 0.1%. If the discussion below has to do with a steel sheet, then a steel strip is also meant by this. The steel sheet in accordance with the invention is characterized not only by the low carbon content, but also by the low concentrations of the additional alloy components. The steel from which the steel sheet in accordance with the invention is made can be a cold-rolled, unalloyed or low-alloy steel. Low-alloy steels are those in which no alloy element exceeds an average content of 5 wt %. In particular, the steel used for the production of the steel sheet in accordance with the invention has less than 0.5 wt %, and preferably less than 0.4 wt % manganese, less than 0.04 wt % silicon, less than 0.1 wt % aluminum, and less than 0.1 wt % chromium. The steel can contain alloy additives of boron and/or niobium, and/or titanium, so as to increase the strength, wherein the addition of boron appropriately lies in the range of 0.001-0.005 wt % and the addition of niobium or titanium lies in the range of 0.005-0.05 wt %. However, weight fractions for Nb<0.03% are thereby preferred.

The steel sheet is first coated with a metallic anti-corrosion layer. The anti-corrosion layer may be, for example, a coating of tin, zinc, aluminum, chromium, or zinc/nickel. The coating is appropriately placed electrolytically on one or both main surfaces of the steel sheet.

For the formation of a multiphase alloy structure and for the melting of the applied coating, the coated steel sheet is then initially annealed, in a recrystallizing manner, at a heating rate of more than 75 K/s, to temperatures of more than 700° C. and quenched after the recrystallizing annealing. The quenching is carried out at a high cooling rate, so as to produce an increase of hardening in the steel. For this purpose, cooling takes place at a cooling rate of at least 100 K/s. The recrystallizing annealing appropriately takes place to temperatures above the A1 conversion point. By means of a recrystallizing heat treatment with a maximum temperature of $T_{max}$>Ac1, an austenitizing of the steel takes place and the subsequent rapid cooling forms a multiphase structure in the steel, which comprises ferrite and at least one of the structure components martensite, bainite, and/or residual austenite. The steel sheet treated in this manner has a tensile strength of at least 500 MPa and an elongation at break of more than 6%.

In accordance with the invention, the corrosion coating is melted during the recrystallizing annealing of the coated steel sheet, so as to thus improve the corrosion resistance of the coating and to better the adhesion on the steel sheet surface. For the melting of the coating, the coated steel sheet is therefore heated to a maximum, during the recrystallizing annealing, at least briefly; this maximum temperature lies above the melting temperature of the coating material. It is, for example, 232° C., with, for example, a tin-plated steel sheet (tinplate), and 419° C. with a zinc-plated steel sheet, and 660° C. with aluminum-coated steel sheets.

The recrystallizing (or austenitizing) annealing of the coated steel sheet by means of electromagnetic induction has proved to be particularly suitable for the production of the packaging steel in accordance with the invention. It was surprisingly discovered that it is possible to do without the addition of alloy components that are typically contained in dual phase steels, as, for example, the addition of manganese (which typically has a weight fraction of 0.8-2.0% in the known dual phase steels), silicon (which typically has a weight fraction of 0.1-0.5% in the known dual phase steels), and aluminum (which is added with a weight fraction of up to 0.2% in the known dual phase steels), if a cold-rolled steel sheet with a carbon content of less than 0.1 wt % is first annealed at a heating rate of more than 75 K/s by means of electromagnetic induction, in a recrystallizing (or austenitizing) manner and is subsequently quenched at a high cooling rate of at least 100 K/s.

The surprisingly observed influence of the inductive heating on the formation and the arrangement of the martensite phase in the induction-annealed steel strip could be explained as follows: Ferromagnetic substances are not magnetized in the absence of an external magnetic field. There are, however, in the interior of these substances, areas (Weiss domains) that are also magnetized to saturation in the absence of external magnetic fields. The Weiss domains are separated by Bloch walls. By the application of an external magnetic field, the favorably oriented—that is, the energetically preferred—Weiss domains grow at the expense of the neighboring areas. The Bloch walls are thereby shifted. The folding of the electron spins does not occur simultaneously thereby, but rather the spins first alternate their direction on the limits of the Weiss domains. With a further field increase, the direction of the magnetization is turned into that of the field, until it coincides, in all areas, with that of the external magnetic field and the saturation is reached. It is also known that a magnetic field can influence the movement of dislocations, without external, adjacent mechanical tensions. It then appears plausible that the Bloch walls take along carbon atoms and/or other dislocations with their displacement. In this way, carbon and/or other dislocations are collected in certain areas, in which subsequently, after annealing and quenching, martensite forms.

Appropriately, the steel sheet is a fine or very fine sheet, which was rolled to its end thickness in the cold rolling process. A fine sheet is understood to be a sheet with a thickness of less than 3 mm and a very fine sheet has a thickness of less than 0.5 mm.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE DISCLOSURE

The invention is explained in detail, below, with the aid of an embodiment example:

For the production of embodiment examples of the steel sheet in accordance with the invention for use as packaging steel, strips made of steel that have been finished in continuous casting and hot-rolled and wound in coils, with the following composition, were employed for use as packaging steel:

| | |
|---|---|
| C: | max. 0.1% |
| N: | max. 0.02% |
| Mn: | max. 0.5%, preferably less than 0.4% |
| Si: | max. 0.04%, preferably less than 0.02% |
| Al: | max. 0.1%, preferably less than 0.05% |
| Cr: | max. 0.1%, preferably less than 0.05% |
| P: | max. 0.03% |
| Cu: | max. 0.1% |
| Ni: | max. 0.1% |
| Sn: | max. 0.04% |
| Mo: | max. 0.04% |
| V: | max. 0.04% |
| Ti: | max. 0.05%, preferably less than 0.02% |
| Nb: | max. 0.05%, preferably less than 0.02% |
| B: | max. 0.005% |
| and other alloy components and impurities: | max. 0.05% |
| the remainder, iron. | |

Figure 1:
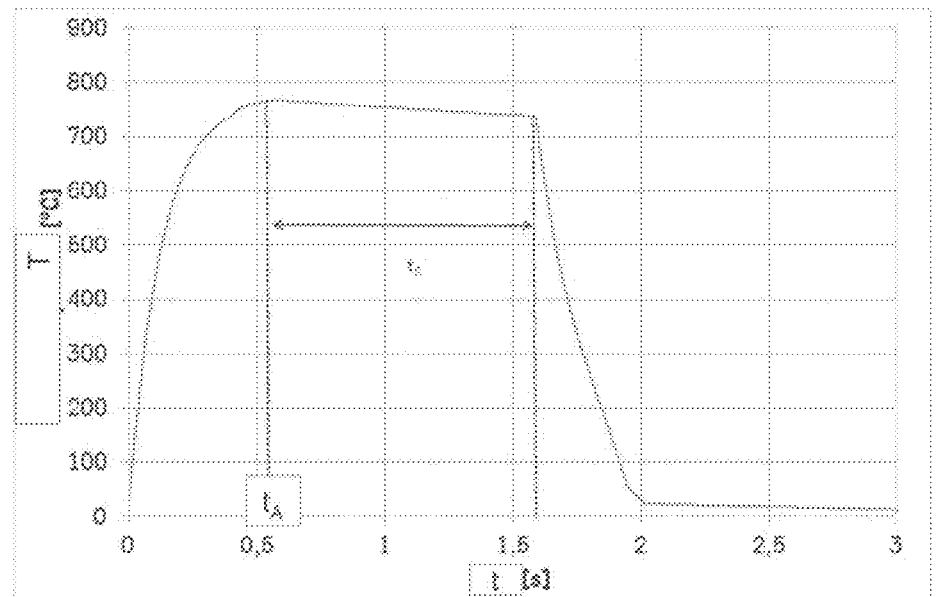
FIG. 1 shows an annealing curve.

This steel sheet was first cold-rolled under a thickness reduction of 50% to 96% to an end thickness in the area of ca. 0.5 mm and subsequently provided, electrolytically, with a tin coating in a strip tin-plating unit. After the coating process, the coated steel sheet was annealed in a recrystallizing manner by induction heating in an induction furnace. An induction coil with an output of 50 kW at a frequency of f=200 kHz was used for this, for example, for a sample size of 20×30. The annealing curve is shown in FIG. 1. As can be seen from the annealing curve of FIG. 1, the steel strip was heated within a very short heating time $t_A$, which is typically between ca. 0.5 s and 10 s, to a maximum temperature $T_{max}$ above the $A_1$ temperature (T ($A_1$) approximately=725° C.). The maximum temperature $T_{max}$ is appropriately below the phase transition temperature $T_f$ of the ferromagnetic phase transition ($T_f$ approximately=770°). The temperature of the steel strip was then maintained at a temperature value above the $A_1$ temperature over an annealing period $t_G$ of ca. 1 s. During this annealing period $t_G$, the steel strip has been cool slightly from its maximum temperature $T_{max}$ of, for example, 750° C. to the $A_1$ temperature (ca. 725° C.). Afterward, the steel strip was cooled to room temperature (ca. 23° C.) by means of a fluid cooling, which can be produced, for example, by a water cooling or an air cooling or by a jet cooling with an inert gas, within a cooling interval of ca. 0.25 s. After the cooling, a skin-passing of the coated steel sheet can be carried out if necessary.

The steel sheet thus treated was subsequently investigated with regard to its strength and its elongation at break. By comparative experiments, it was possible to show that in all cases, the elongation at break was higher than 6% and, as a rule, higher than 10%, and that the tensile strength showed at least 500 MPa and, in many cases, even tensile strengths in the range of 600 to 800 MPa.

Figure 2:
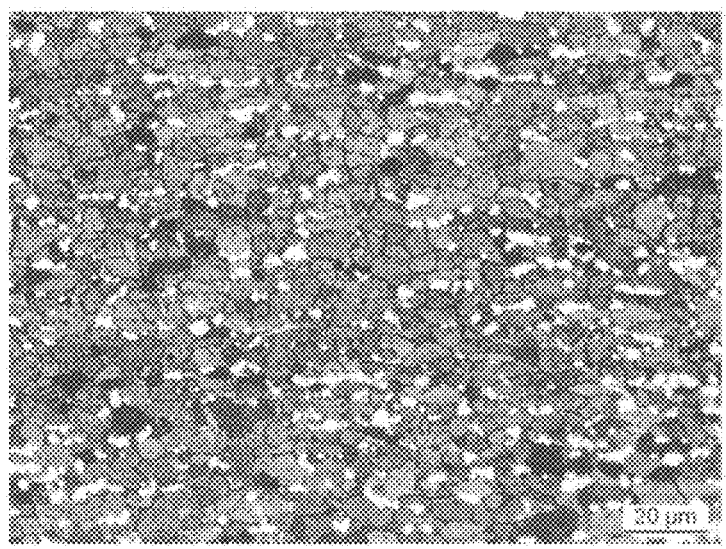
FIG. 2 shows a micrograph.

By a splatter paint etching according to Klemm, it was possible to demonstrate that the steel sheets treated in accordance with the invention have an alloy structure, which has ferrite as the soft phase and martensite and perhaps bainite and/or residual austenite as the hard phase. FIG. 2 shows a structure in cross section with a Klemm splatter paint etching, wherein the areas shown in white there show the martensite phase and the blue or brown areas show the ferrite phase. A line-shaped arrangement of the higher-strength phase (martensite/bainite) is shown therefrom.

By comparative experiments, it was possible to determine that the best results with regard to strength and formability are attained if the heating rate during the recrystallizing annealing is between 200 K/s and 1200 K/s and if the steel strip annealed in a recrystallizing manner is subsequently annealed at a cooling rate of more than 100 K/s. Cooling rates between 350 K/s and 1000 K/s are hereby appropriate for the apparatus, because it is then possible to dispense with an expensive apparatus for water or oil cooling, and the cooling can be done by means of a cooling gas, such as air. The best results with regard to the material characteristics are, however, attained when a water cooling is used, with cooling rates of more than 1000 K/s. Excessively high cooling rates, however, entail the risk of cracks and a warping of the steel sheet during the quenching.

Since the coated steel sheet was heated to temperatures above the melting point of the (tin) coating with recrystallizing annealing, the corrosion coating was melted during the annealing. This leads to an improvement in the corrosion and acid resistance of the coating and to an improved adhesion of the coating on the steel sheet surface. The improved adhesion is thereby effected by the formation of a thin (compared to the thickness of the coating) and very dense alloy layer between the steel sheet surface and the coating, which consists of iron atoms of the steel and the atoms of the coating material (that is, for example, tin). Depending on the process parameters, thicknesses of the alloy layer can be attained that correspond to an alloy coating layer of less than 0.5 g/m$^2$ or even less than 0.3 g/m$^2$. By the melting of the coating during the recrystallizing annealing, the porosity of the coating is also lowered and thus its corrosion and acid resistance are increased. At the same time, the melting of the coating leads to an improvement of the surface brilliance of the coating, since the originally matte surface of the coating becomes shiny due to the melting and rapid quenching.

It has been shown that after the quenching of the coated steel sheet in a water bath, a dark oxide layer is formed on the surface of the coating. To remove this undesired oxide layer, the coated steel sheet is appropriately treated, during or after the quenching, with a light acid, for example, a 15% hydrochloric acid. For the purpose, however, other acids and acids in other concentrations can also be used. It is particularly efficient when a cold acid bath that contains the acid is used as the quenching liquid. Then, the removal of the oxide layer and the quenching can take place by means of the acid treatment at the same time by immersion of the coated steel sheet.

The steel sheet produced in accordance with the invention is excellent for use as a packaging steel. Thus, for example, cans for foods or beverages are made from the steel sheet in accordance with the invention that, especially in the food area, meet high corrosion and acid resistance demands.

The coating can take place thereby on one side or on both sides, depending on the requirements.

In comparison to dual phase steels known from automobile construction, the steel sheet in accordance with the invention for use as packaging steel is characterized, in particular, by the essentially lower production costs and by the advantage that a steel with low alloy concentration and few alloy components can be used, wherein contaminations of the packed foods can be avoided. With regard to strength and formability, the steel sheet in accordance with the invention is comparable to the dual phase steels known from automobile construction. The full-hard structure of the cold-rolled steel is converted, by the recrystallizing annealing, into a multiphase structure that has a high tensile strength and a good elongation at break. The recrystallizing annealing takes place thereby—in contrast to, for example, the known tin-plating process—only after the coating of the steel sheet with a metallic coating. Since the metallic coating is simultaneously melted with the recrystallizing annealing in accordance with the invention, the quality of the corrosion coating is also increased with regard to its corrosion and acid resistance and with regard to this surface luster. The method in accordance with the invention is therefore very energy-efficient, because the structure conversion in the steel and the melting of the coating simultaneously take place in one single method step (recrystallizing annealing with a subsequent quenching). The recrystallizing annealing of the steel sheet can therefore (after the coating) take place in the coating unit and not, as is common in the state of the art (before the coating), outside the coating unit, in a separate annealing step. This makes possible a streamlined process operation and considerably reduces the apparatus outlay. A recrystallizing heat treatment of the steel sheet before the coating process is not required in the method in accordance with the invention.

The invention claimed is:

1. A method for the production of a packaging steel from a cold-rolled steel sheet of an unalloyed or low-alloy steel with a carbon content of less than 0.1 wt % and a manganese content of less than 0.4 wt %, the method comprising:
   coating the steel sheet with a metallic coating;
   heating the coated steel sheet with electromagnetic induction to temperatures of more than 700°, at a heating rate of more than 100 K/s, thereby annealing the steel sheet and melting the metallic coating; and
   quenching the annealed steel sheet with a cooling rate of at least 500 K/s, whereby in the steel a multi-phase structure is formed, which comprises ferrite and at least one of the structural constituents martensite, bainite and/or residual austenite.

2. The method according to claim 1, wherein the coated steel sheet is quenched after the annealing at a cooling rate of more than 700 K/s.

3. The method according to claim 1, wherein the steel has a silicon content of less than 0.04 wt %,
an aluminum content of less than 0.1 wt %,
and a chromium content of less than 0.1 wt %.

4. The method according to claim 1, wherein the multi-phase structure consists of more than 80% of the structural components ferrite, martensite, bainite, and/or residual austenite.

5. The method according to claim 1, wherein the steel sheet is made from a low-alloy steel that contains boron and/or niobium and/or titanium.

6. The method according to claim 1, wherein the steel sheet is a cold-rolled fine or very fine sheet.

7. The method according to claim 1, wherein the coated steel sheet is heated to temperatures above an A1 conversion point during the recrystallizing annealing of the steel.

8. The method according to claim 1, wherein, after the recrystallizing annealing and the quenching, the steel sheet has a tensile strength of at least 500 MPa, and an elongation at break of more than 5%.

9. The method according to claim 1, wherein the steel sheet is made from a low-alloy steel with upper limits for the weight fraction of the alloy components as follows:

| | |
|---|---|
| N: | max. 0.02% |
| Mn: | max. 0.4% |
| Si: | max. 0.04% |
| Al: | max. 0.1% |
| Cr: | max. 0.1% |
| P: | max. 0.03% |
| Cu: | max. 0.1% |
| Ni: | max. 0.1% |
| Sn: | max. 0.04% |
| Mo: | max. 0.04% |
| V: | max. 0.04% |
| Ti: | max. 0.05% |
| Nb: | max. 0.05% |
| B: | max. 0.05% |
| and other alloy components, including impurities: | max. 0.05%. |

10. The method according to claim 1, wherein the steel sheet is cooled after the annealing by a cooling fluid or by a jet cooling with inert gas, at a cooling rate between 500 K/s and 1200 K/s.

11. The method according to claim 1, wherein
the annealing takes place in a time interval of 0.5 to 1.5 s.

12. The method according to claim 1, wherein the metallic coating is an anti-corrosion layer made of tin, zinc, aluminum, or chromium.

13. The method according to claim 1, wherein the metallic coating is electrolytically applied on the steel sheet.

14. The method according to claim 1, wherein the surface of the steel sheet coated with the metallic coating is treated with an acid during or after the cooling quenching.

15. The method according to claim 14, wherein the quenching and the acid treatment of the coated surface of the steel sheet takes place by immersion of the coated steel sheet in an acid bath.

* * * * *